United States Patent [19]
Goodknight

[11] Patent Number: 5,992,782
[45] Date of Patent: Nov. 30, 1999

[54] TAPE DRIVE COUPLING APPARATUS

[75] Inventor: Frank A. Goodknight, Niwot, Colo.

[73] Assignee: Storage Technology Corporation, Louisville, Colo.

[21] Appl. No.: 08/780,755

[22] Filed: Jan. 8, 1997

[51] Int. Cl.$^6$ .......................... G11B 23/04; G11B 23/087
[52] U.S. Cl. .......................... 242/340; 242/342; 360/96.3; 464/69; 464/85
[58] Field of Search .................................. 242/340, 342; 360/96.3; 464/69, 98, 100, 101, 84, 85

[56] References Cited

U.S. PATENT DOCUMENTS

| | | | |
|---|---|---|---|
| 2,721,457 | 10/1955 | Moore | 464/100 |
| 5,490,020 | 2/1996 | Albrecht et al. | 360/96.3 |

FOREIGN PATENT DOCUMENTS

| | | | |
|---|---|---|---|
| 404285321 | 10/1992 | Japan | 464/98 |

Primary Examiner—John Q. Nguyen

Attorney, Agent, or Firm—Brooks & Kushman P.C.

[57] ABSTRACT

A high torsional stiffness, low axial, angular and radial deflection stiffness tape drive coupling apparatus is used for driving a cassette reel with a drive motor. The apparatus includes a base which is attached to the drive motor, a compression spring disposed against the base, and a flexure member positioned adjacent the base. The flexure member includes a plurality of orthogonally extending flexible arms, at least two of the arms having a distal end connected with the base. A driver is engageable with the cassette reel and is connected with at least two of the flexible arms. An apparatus is provided for limiting axial separation of the base and driver while allowing radial and angular misalignment therebetween. Accordingly, the driver is movable axially and angularly with respect to the base by compression of the spring between the driver and base. The driver is movable radially with respect to the drive axis by flexion of at least two of the plurality of flexible arms. The driver is relatively torsionally rigid with respect to the base to facilitate rotational driving engagement of the cassette reel when there exists axial, radial, or angular misalignment between the driver and cassette reel.

14 Claims, 4 Drawing Sheets

1 …

TAPE DRIVE COUPLING APPARATUS

TECHNICAL FIELD

The present invention relates to a tape drive coupling apparatus for driving a tape cartridge reel with a drive motor, and more particularly to a high torsional stiffness, low axial, angular and radial deflection stiffness flexible drive shaft system for rotating recordable media.

BACKGROUND OF THE INVENTION

Coupling a drive motor to a cassette reel can be problematic as a result of radial, axial, or angular misalignment between the drive motor output shaft and the cassette reel axle. One option in addressing this problem is to use a data cartridge which incorporates a drive belt. This solution generally only solves the radial misalignment problem. Another option, which is used in all audio and video cassette systems, is to allow the tape reel to float inside the cartridge. The tape reels in such systems do not rotate on axes that are rigidly attached to the cartridge. The reels can move within a certain range to align with the drive axes. Usually, the engagement method has some kind of self-centering device, such as multi-toothed couplings, or the reel is allowed a certain amount of wobble. A third option is to have the tape reels rotate on axes that are rigidly connected to the cassette housing, and allow the driveshaft axes to adjust to the cassette reels. The advantage of this kind of system is that a precision tape path can be defined entirely within the cassette for excellent guiding, low debris generation, etc. In this option, each reel includes an axle with a bearing that is designed to have a close fit, however, the axle will rock slightly if the tape driving mechanism is not aligned with it. This rocking motion results in an unreliable tape path which can cause low quality recording or playing of the tape.

Referring to FIGS. 1—3, an apparatus 10 for driving a tape reel is shown in accordance with a prior art embodiment. The tape drive apparatus 10 includes a multi-toothed coupling 12 which is connected to an output shaft 14 of a motor 16. The output shaft 14 has an axis of rotation 18. The tape reel includes a multi-toothed coupling 20 and is mounted for rotation about an axis 22 by an axle 24 which is connected to a cassette housing 26. As shown in FIG. 1, the motor shaft axis 18 and reel axis 24 are radially misaligned. This will cause the multi-toothed couplings 12,20 to improperly mesh, which will result in rocking of the tape reel 28 on the axis 22 and undue wear between the gears.

Turning to FIG. 2, another meshing problem is illustrated. In this Figure, it is shown that the multi-toothed couplings 12,20 are axially misaligned, in that the multi-toothed couplings are undesirably too far apart. This axial misalignment creates difficulty in multi-toothed coupling meshing.

Turning to FIG. 3, another problem associated with prior art tape drive assemblies is illustrated in that the axes 18 and 22 are angularly misaligned, which will lead to improper multi-toothed coupling meshing, which may lead to backlash and other quality problems.

The typical off-center drive problem is addressed in various art areas by mechanical devices, such as universal joints in automobiles, elastic joints in heavy machinery, and bellows couplings or Oldham couplings in precision equipment. None of these prior art devices provide the high torsional stiffness and low axial deflection stiffness required in a tape drive assembly while being capable of supporting a thrust load. The high torsional stiffness is required to rotate the cassette reel and the low axial deflection stiffness is required to prevent the exertion of a tipping torque on the reel axle. Large tipping torques can result in rocking of the reel.

U.S. Pat. No. 5,490,020 to IBM teaches one effort to overcome the above-referenced problem experienced with prior art assemblies. In effect, this design incorporates a version of a universal joint used in cooperation with a telescoping joint for addressing the radial and axial misalignment problems. However, this assembly is very complex and expensive to manufacture, and it exhibits undesirable backlash and the torsional stiffness is too low. Also, the design is very tall, so it consumes substantial space.

DISCLOSURE OF THE INVENTION

The present invention overcomes the above-referenced shortcomings of prior art tape drive coupling assemblies by providing a high torsional stiffness, low axial deflection stiffness, and low angular deflection stiffness tape drive coupling apparatus which incorporates a flexure member having a plurality of orthogonally extending flexible arms which cooperate with a base and driver for allowing easy radial movement of the driver for overcoming radial misalignment. A compression spring separates the base from the driver in a manner such that the compression spring compensates for axial misalignment and angular misalignment by allowing relative axial and angular movement between the base and driver.

More specifically, the present invention provides a tape drive coupling apparatus for driving a cassette reel with a drive motor having a drive axis. The apparatus comprises a base adapted for attachment to the drive motor for rotation therewith. A compression spring is disposed against the base. A flexure member comprises a plurality of orthogonally extending flexible arms, at least two of the arms having a distal end connected with the base. A driver is engageable with the cassette reel and is connected with the distal end of at least two of the plurality of flexible arms. An apparatus is provided for limiting axial separation of the base and driver while allowing radial and angular misalignment therebetween. Accordingly, the driver is movable axially and angularly with respect to the base by compression of the spring between the driver and base. The driver is movable radially with respect to the drive axis by flexion of at least two of the plurality of flexible arms. In this configuration, the driver is relatively torsionally rigid with respect to the base to facilitate rotational driving engagement of the cassette reel when there exists axial, radial or angular misalignment between the driver and cassette reel.

Accordingly, an object of the present invention is to provide a high torsional stiffness, low axial deflection stiffness, and low angular deflection stiffness tape drive coupling apparatus which is inexpensive to manufacture and highly effective in compensating for radial, axial, or angular misalignment between a drive motor axle and cassette reel axle.

The above object and other objects, features, and advantages of the present invention are readily apparent from the following detailed description of the best modes for carrying out the invention when taken in connection with the accompanying drawings.

DETAILED DESCRIPTION OF THE PREFERRED EMBODIMENT

Figure 4:
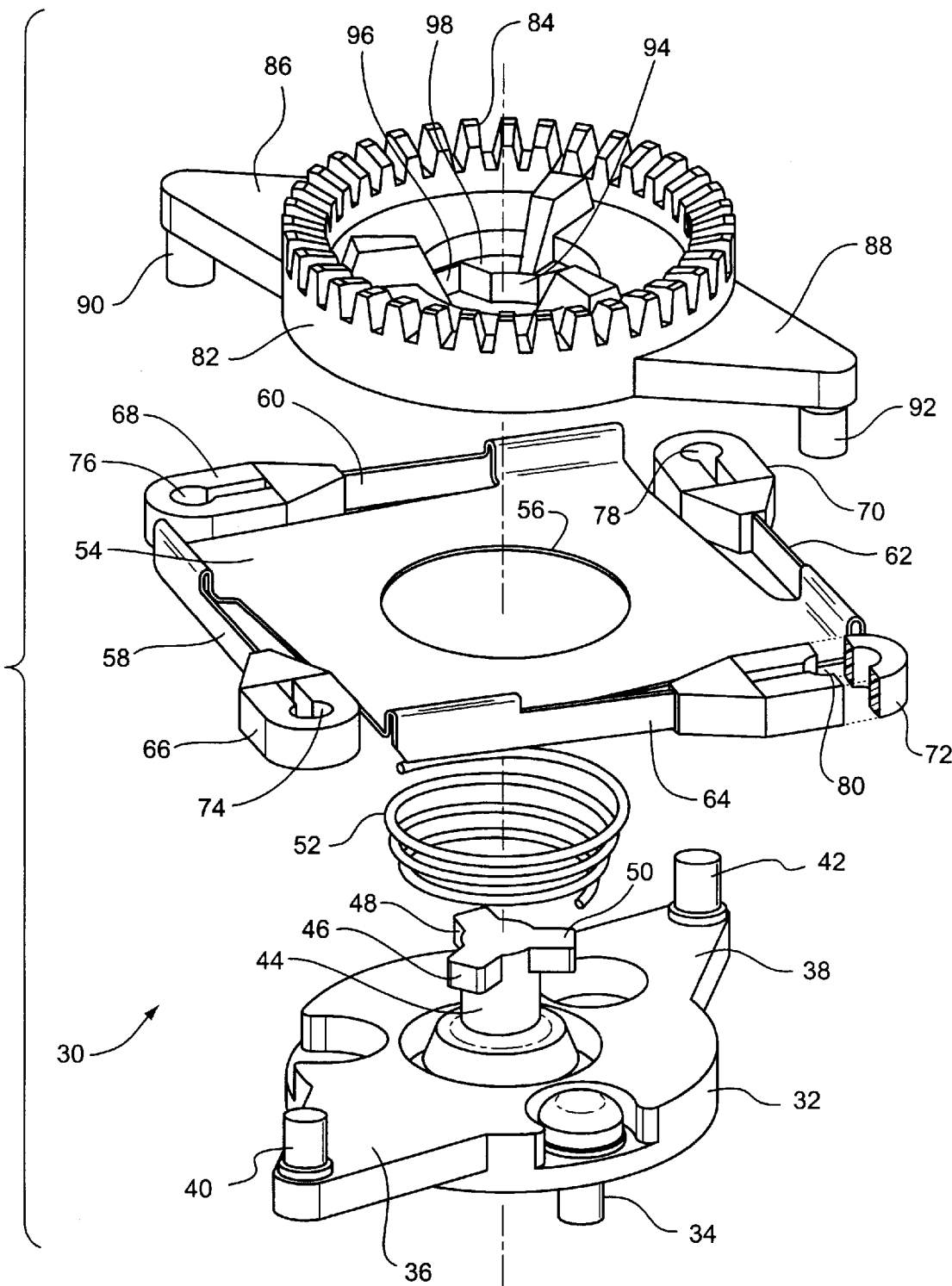
FIG. 4 shows an exploded perspective view of a tape drive coupling apparatus in accordance with the present invention.

Referring to FIG. 4, a preferred embodiment of a tape drive coupling apparatus 30 is shown in accordance with the present invention. The tape drive coupling apparatus 30 includes an aluminum base 32 attachable to the drive motor output shaft by means of the attachment screws 34. The base 32 includes flanges 36,38 with first and second base pins 40,42 extending therefrom.

The base 32 further comprises a central rod 44 extending therefrom with three lock members 46, 48, 50 extending radially from the distal end of the central rod 44. A compression spring 52 is disposed around the central rod 44 and engages against the base 32.

A flexure member 54 includes a central aperture 56 formed therethrough. The central aperture 56 is sufficiently large to allow the central rod 44 with its radially extending lock members 46, 48, 50 to pass therethrough, as well as the spring 52. The flexure member 54 is preferably a stamped stainless steel component having a thickness between 0.007 and 0.010 inches. Alternatively, the flexure member 54 could be beryllium copper, spring steel, etc. The flexure member 54 includes four orthogonally extending flexible arms 58, 60, 62, 64. The orthogonally extending arms 58, 60, 62, 64 each comprise an injection molded plastic component 66, 68, 70, 72 secured at the distal end of the respective arm 58, 60, 62, 64. Each injection molded plastic component 66, 68, 70, 72 forms an aperture 74, 76, 78, 80 therein. The apertures 74,78 cooperate with the pins 40,42 on the base.

An aluminum driver 82 is provided with a multi-toothed coupling 84 formed thereon for engaging the multi-toothed coupling of the cassette reel. The driver 82 includes opposing flanges 86,88 with driver pins 90,92 extending therefrom for cooperation with the apertures 76,80, respectively, in the flexible arms 60,64 of the flexure member 54. The driver 82 includes an aperture 94 formed therein and having three radially extending slots 96 (only one shown in FIG. 4) for cooperation with the lock members 46, 48, 50 of the central rod 44. Accordingly, in order to secure the assembly together, the central rod 44 is inserted through the compression spring 52, through the central aperture 56 in the flexure member 54, and further through the aperture 94 in the driver 82. As the central rod 44 is inserted through the aperture 94 of the driver member 82, the lock members 46, 48, 50 are oriented to align with the slots 96 formed in communication with the aperture 94 and the driver 82 to allow the lock members 46, 48, 50 to pass through the driver 82. Once the lock members 46, 48, 50 have passed through the slots 96, the central rod 44 is then rotated slightly so that the lock members 46, 48, 50 engage the respective land portion 98 on the driver 82.

Figure 1:
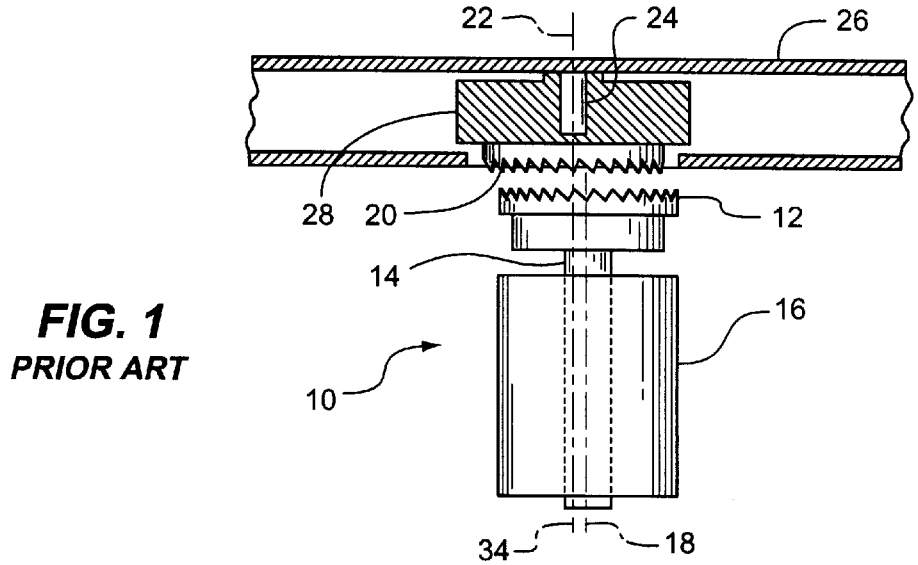
FIG. 1 is a schematic illustration of a prior art tape drive coupling apparatus illustrating radial misalignment.
Figure 2:
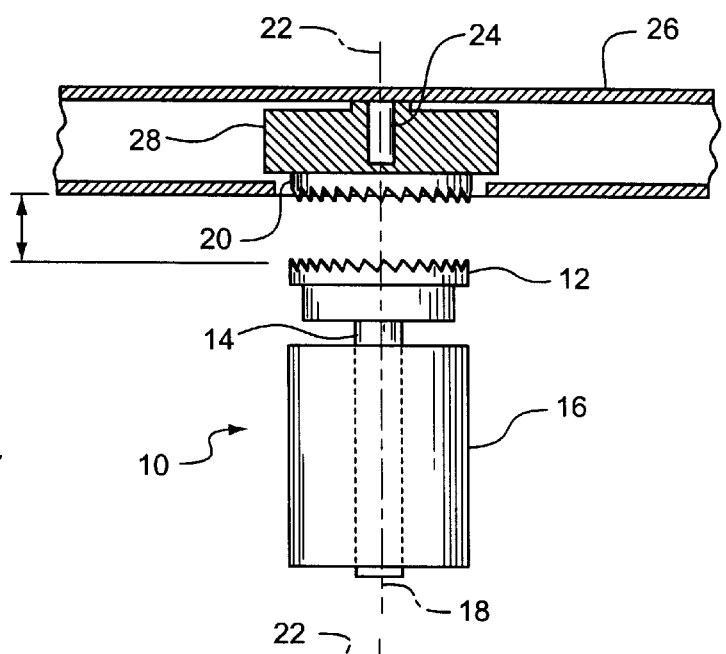
FIG. 2 is a schematic illustration of a prior art tape drive coupling apparatus illustrating axial misalignment.
Figure 3:
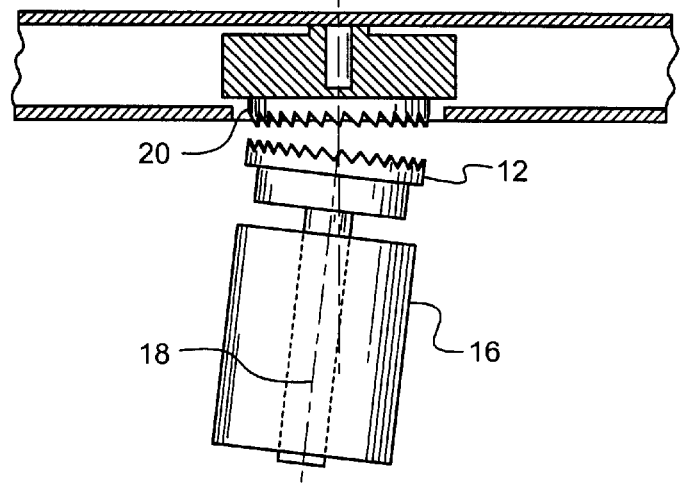
FIG. 3 is a schematic illustration of a prior art tape drive coupling apparatus illustrating angular misalignment.

In this configuration, when the driver 82 is axially misaligned away from the cassette reel, as illustrated in FIG. 2, the compression spring 52 will adjust the axial position of the driver 82 to compensate for such misalignment. When the driver 82 is angularly misaligned with the cassette reel, as illustrated in FIG. 3, the compression spring 52 will compensate by compressing on one side to allow angular tipping of the driver 82 with respect to the central rod 44. Furthermore, when the driver 82 is radially misaligned with the cassette reel, as illustrated in FIG. 1, the flexion of the flexible arms 58, 60, 62, 64 will allow the driver 82 to move side-to-side with respect to the base 32, thereby compensating for any such radial misalignment between the driver 82 and cassette reel.

Figure 5:
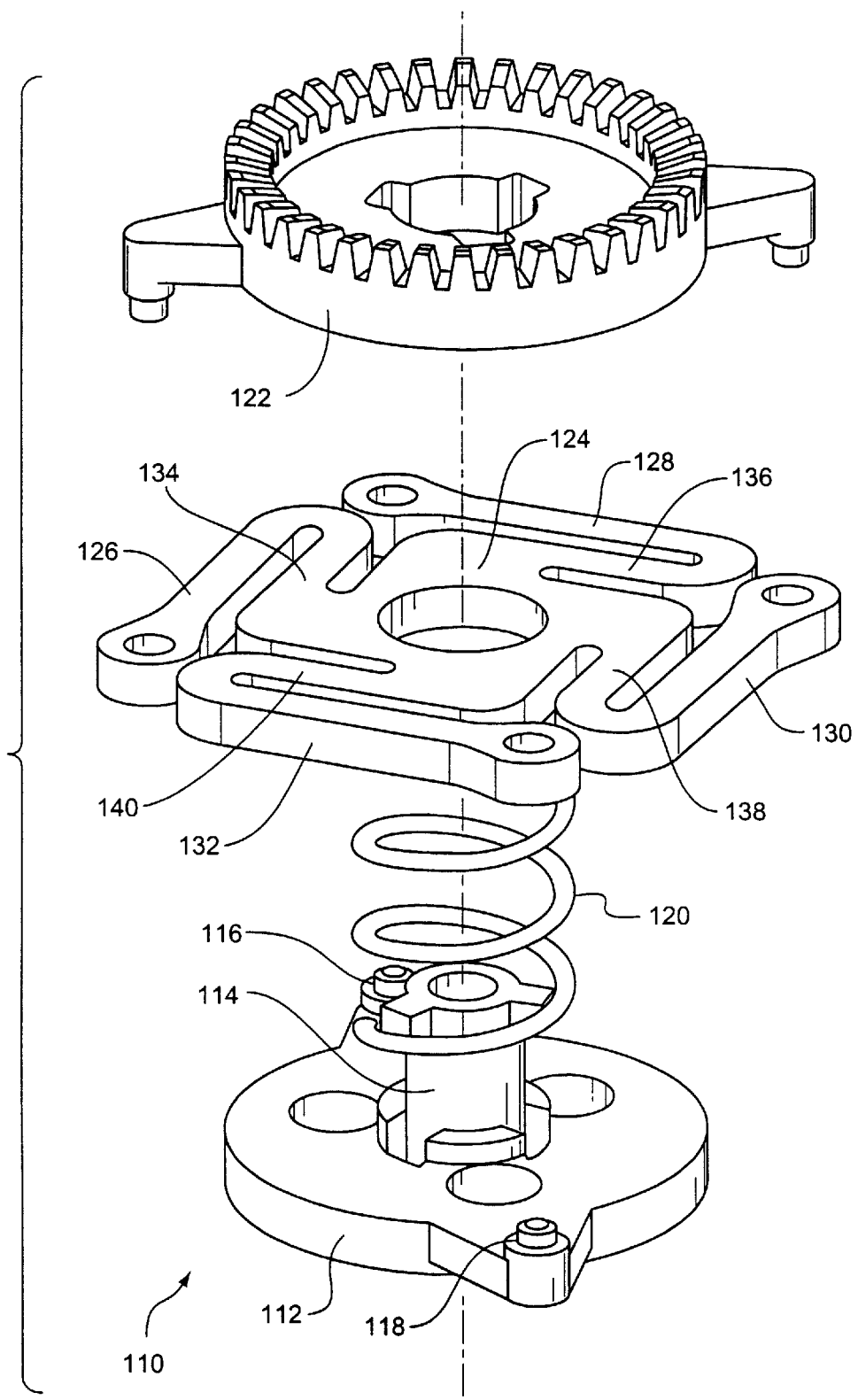
FIG. 5 shows an exploded perspective view of a tape drive coupling apparatus in accordance with a second embodiment of the present invention.

Turning to FIG. 5, an exploded perspective view of a tape drive coupling apparatus 110 in accordance with a second embodiment of the present invention is shown. Much like the embodiment illustrated in FIG. 4, the second embodiment shown in FIG. 5 includes a base 112 having a central rod 114 and base pins 116,188. This embodiment further comprises a compression spring 120 and driver 122 with a flexure member 124 positioned between the spring and driver. This embodiment differs from the embodiment illustrated in FIG. 4 primarily in the design of the flexure member 124.

In this embodiment, the flexure member 124 comprises an injection molded plastic component having orthogonally extending arms 126, 128, 130, 132, each arm having a second portion 134, 136, 138, 140 extending in a direction opposite the respective orthogonally extending first portion 126, 128, 130, 132. This configuration provides the same side-to-side or radial misalignment flexibility as described above with reference to the embodiment shown in FIG. 4, and functions in a like manner as the previous embodiment in all other respects.

Figure 6:
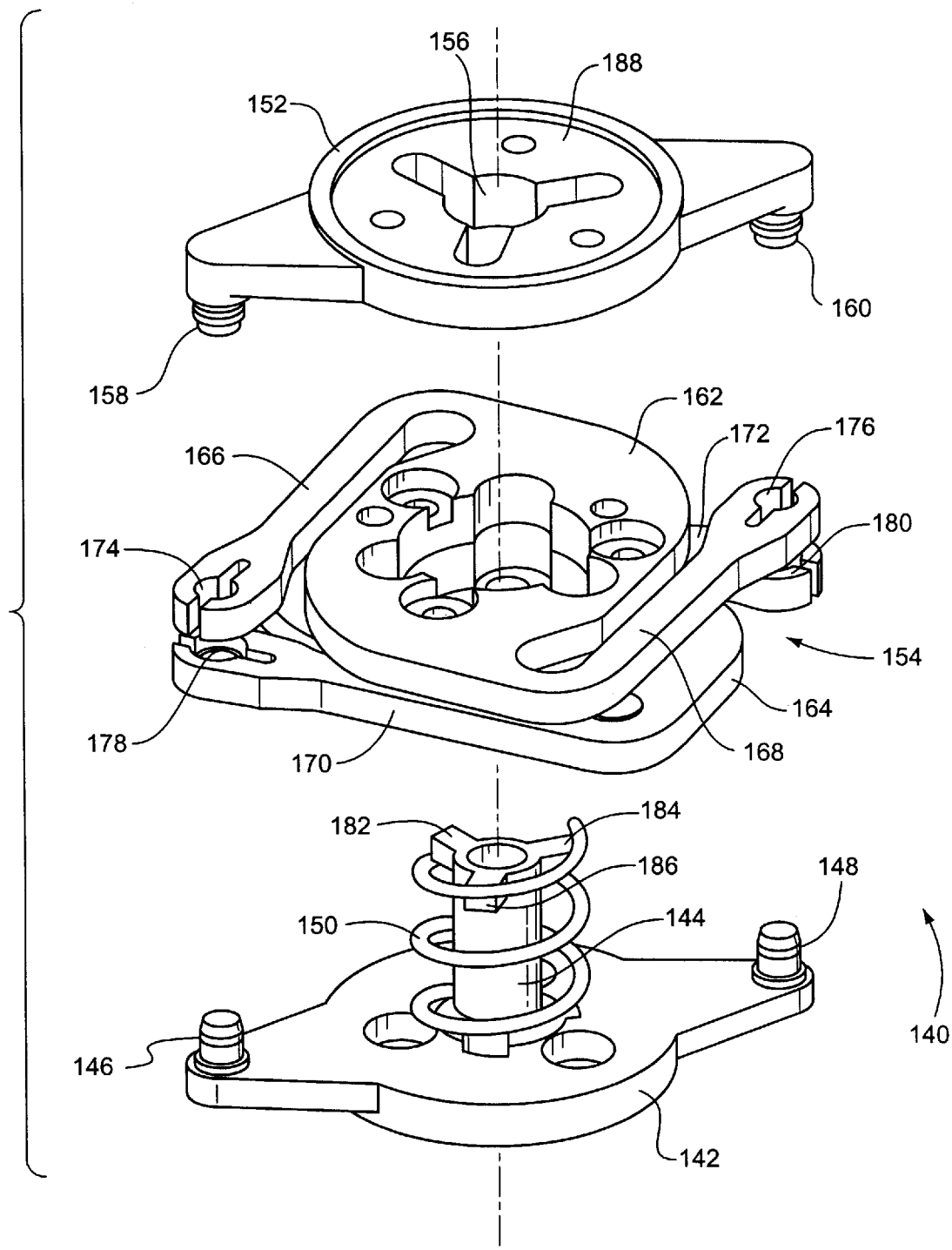
FIG. 6 shows an exploded perspective view of a tape drive coupling apparatus in accordance with a third embodiment of the present invention.

Turning to FIG. 6, a tape drive coupling apparatus 140 is shown in accordance with a third embodiment of the present invention. Similarly, this embodiment comprises a base 142 with a central rod 144 and base pins 146,148 extending therefrom. A compression spring 150 and driver 152 are provided with the flexure member 154 secured therebetween. The driver 152 includes a central slotted aperture 156 and driver pins 158,160 extending therefrom.

This third embodiment differs from the previous embodiments primarily in the design of the plastic flexure member 154. In this embodiment, the flexure member includes first and second portions 162,164 having respective arms 166, 168, 170, 172 with apertures 174 formed at the distal ends of the respective arms for cooperation with the pins 158, 160, 146, 148, respectively.

As in the previously described embodiments, the central rod 44 with its radially extending locking members 182, 184, 186 acts as an apparatus for limiting axial separation of the base 142 and driver 152 while allowing radial and angular misalignment therebetween. The locking members 182, 184, 186 limit axial separation of the base and driver by engaging the top surface 188 of the driver 152. However, axial separation could be limited by various other means, such as bolts, etc.

While the best modes for carrying out the invention have been described in detail, those familiar with the art to which this invention relates will recognize various alternative designs and embodiments for practicing the invention within the scope of the appended claims.

What is claimed is:

1. A high torsional stiffness, low axial, angular and radial deflection stiffness tape drive coupling apparatus for driving a cassette reel with a drive motor having a drive axis, the apparatus comprising:

a base adapted for attachment to the drive motor for rotation therewith;

a driver engageable with the cassette reel;

a compression spring operatively disposed between the base and driver such that said driver is movable axially and annularly with respect to said base by compression and expansion of said spring between the driver and base;

a flexure member connecting the base and driver and comprising a plurality of orthogonally extending flexible arms which are flexible for movement in a common plane, at least two of said arms each having a distal end connected with said base;

an apparatus extending between said base and driver for limiting axial separation of said base and driver while allowing radial and angular misalignment therebetween; and wherein the driver is connected with the distal end of any two of said plurality of flexible arms different from the at least two arms connected with said base;

whereby said driver is movable radially with respect to the drive axis by flexion of at least two of said plurality of flexible arms, and wherein said flexure member is sufficiently torsionally rigid to facilitate rotational driving engagement between the driver and base for driving the cassette reel when there exists axial, radial or angular misalignment between the driver and cassette reel.

2. The tape drive coupling apparatus of claim 1, wherein said base and driver comprise aluminum and said flexure member comprises plastic.

3. The tape drive coupling apparatus of claim 1, wherein said flexure member comprises a stamped steel component and said plurality of orthogonally extending flexible arms comprise four orthogonally extending flexible arms having injection molded plastic components at the distal ends thereof forming said connection with the base and the driver.

4. The tape drive coupling apparatus of claim 1, wherein said flexible arms comprise four orthogonally extending plastic arms, each said arm comprising a first portion and a second portion extending in a direction opposite from the first portion.

5. The tape drive coupling apparatus of claim 1, wherein said flexure member comprises first and second plastic portions, each plastic portion having first and second orthogonally extending arms forming said flexible arms.

6. The tape drive coupling apparatus of claim 1, wherein said apparatus extending between said base and driver for limiting axial separation of said base and driver comprises a central rod extending from one of said base and driver and engaging within an aperture formed in the other of said base and driver.

7. The tape drive coupling apparatus of claim 6, wherein said central rod comprises a plurality of radially extending lock members, and said aperture comprises a corresponding plurality of radially extending slots formed for cooperation with said plurality of lock members to facilitate insertion of the lock members therethrough for locking.

8. A tape drive coupling apparatus for coupling a drive motor to a cassette reel, the apparatus comprising:

a base adapted for attachment to the drive motor for rotation therewith, said base having a central rod extending therefrom with at least one lock member extending radially from the distal end of the central rod, said base further comprising first and second base pins extending therefrom;

a compression spring disposed around said central rod;

a flexure member having a central aperture formed therethrough, said flexure member having said central rod extending through said central aperture, and said flexure member further comprising at least four orthogonally extending flexible arms having apertures formed at the distal ends thereof, at least two of said arms respectively engaging said first and second base pins; and a driver engageable with the cassette reel, said driver having first and second driver pins extending therefrom respectively engaging with said apertures formed at the distal ends of any two of said at least four flexible arms different from said at least two arms engaged with said base pins, said driver further having a slotted aperture with a respective slot formed therein to facilitate insertion of said central rod through the slotted aperture such that said at least one lock member passes through the respective slot and the base is rotatable to move the respective lock member away from the respective slot for locking engagement with the driver to secure the driver to the base and to capture the flexure member and compression spring between the driver and base; and wherein said driver is movable axially and angularly with respect to said rod by compression of said spring, said driver is movable radially with respect to said rod by flexion of said at least four flexible arms, and said flexure member is sufficiently torsionally rigid to facilitate rotational driving engagement between the driver and base for driving the cassette reel when there exists axial, radial, or angular misalignment between the driver and cassette reel.

9. The tape drive coupling apparatus of claim 8, wherein said flexure member comprises a stamped steel component and said at least four orthogonally extending flexible arms comprise four orthogonally extending flexible arms having injection molded plastic components at the distal ends thereof forming said distal end apertures.

10. The tape drive coupling apparatus of claim 8, wherein said at least four flexible arms comprise four orthogonally extending plastic arms, each arm comprising a first portion and a second portion extending in a direction opposite from the first portion.

11. The tape drive coupling apparatus of claim 8, wherein said flexure member comprises first and second plastic portions, each plastic portion having first and second orthogonally extending arms forming said flexible arms.

12. The tape drive coupling apparatus of claim 8, wherein said base and driver comprise aluminum and said flexure member comprises plastic.

13. The tape drive coupling apparatus of claim 8, wherein said at least one lock member comprises three lock members and said slotted aperture comprises a hole with three slots extending radially therefrom.

14. A tape drive coupling apparatus for driving a cassette reel by a drive motor having a drive axis, the apparatus comprising:

a base adapted for attachment to the drive motor for rotation therewith;

a compression spring disposed against the base;

a flexure member comprising four orthogonally extending flexible arms which are flexible for movement in a common plane, each of said arms having a distal end, at least two of the distal ends being respectively connected with said base;

a driver engageable with said cassette reel, said driver being respectively connected with the distal end of any two of said flexible arms different from said at least two arms connected with said base; and an apparatus for limiting axial separation of said base and driver while allowing radial and angular misalignment therebetween;

whereby said compression spring is disposed between the base and the driver such that said driver is movable axially and angularly with respect to said base by compression of said spring between the driver and base, said driver is movable radially with respect to the drive axis by flexion of at least two of said flexible arms, and said driver is relatively torsionally rigid with respect to said base to facilitate rotational driving engagement of the cassette reel when there is axial, radial or angular misalignment between the driver and cassette reel.

* * * * *